United States Patent Office 3,164,763
Patented Jan. 5, 1965

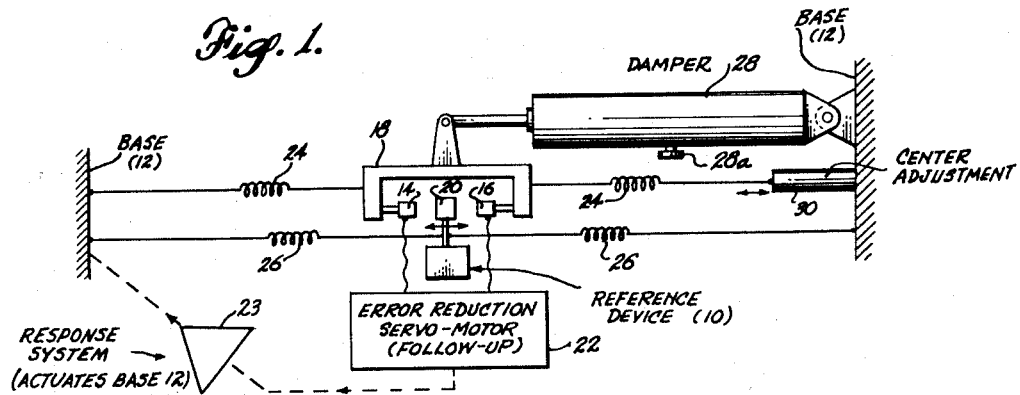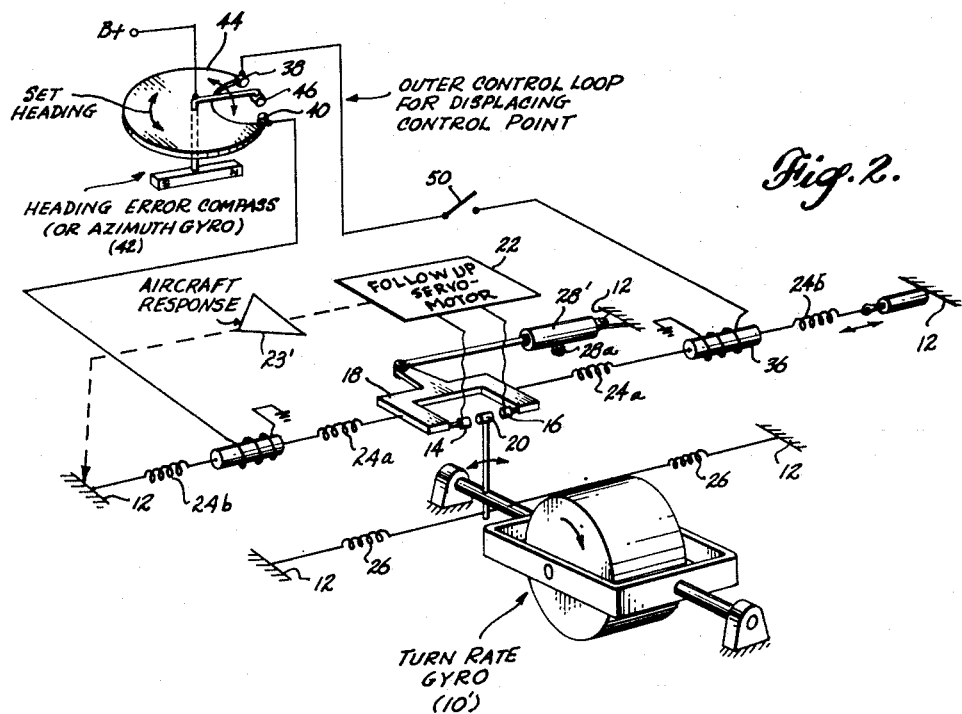

3,164,763
STABILIZING DEVICE FOR CONTROL SYSTEMS
Robert M. Kelley, Wichita, Kans., assignor to Boeing Airplane Company, Seattle, Wash., a corporation of Delaware
Filed Apr. 13, 1961, Ser. No. 102,739
11 Claims. (Cl. 318—489)

This invention relates to improvements in control and follow-up systems, and more particularly in systems wherein an error or command signal, developed by displacement between a system base (e.g. an aircraft) and a system reference device (e.g. yaw rate gyro, lateral accelerometer, angle of attack vane, etc.) is applied to a servomechanism to correct the error or respond to the command. The invention is herein illustratively described by reference to its presently preferred embodiments; however, certain modifications and changes therein concerning details, and various other applications thereof may be made without departing from the essential features involved.

In automatic pilot or other stabilized or stability-augmenting flight control systems of the usual fully modulated forms complex electronic computer devices comprising amplifiers, relays, function generators, etc. are normally employed. These are employed to introduce anticipation or damping factors which reduce to an acceptable minimum the oscillations or hunting effects otherwise present in a position or condition-seeking follow-up system controlled by error signals, command signals or a combination of both.

The present invention has for its broad object the provision of an anticipation system or device which provides or augments stability by simple, inexpensive, reliable, compact, lightweight and direct-acting means. Such a means finds useful application, therefore, in many cases wherein the greater complexity, cost, weight, bulk and critical sensitivity of fully modulated electronic systems present serious difficulty or preclude their use.

A related object herein is to provide such a means which functionally utilizes feedback furnished entirely by response-controlled movement of the base (e.g. the aircraft) itself, and which is applicable to any of various error correction or command response functions, not only in aircraft but elsewhere. Systems utilizing the invention may comprise simple error derivative and follow-up correction servo systems, command signal response and follow-up systems, or systems performing a combination of these functions. Moreover, auxiliary control functions may be superimposed or added, as desired, just as in the more complex electronic control servo systems in use.

In acordance with this invention as herein disclosed by reference to its application in a vehicle stabilizing rate-controlled servomechanism, for example, the spring centered and restrained reference device (e.g. rate gyro) actuates an electrical switch device including a spring centered and restrained switch unit having alternatively engageable contacts which are electrically separate but physically interconnected, and cooperating switch contact means. Contact engagement, effected by relative displacement between the system base and reference device, deflects the switch centering spring means, whose centering and restraining effect is added to that already provided in the reference device proper. Such contact engagement provides an error signal or command signal to a follow-up servo to restore the system to neutrality, that is reduce the displacement mentioned. In the follow-up process effecting this reduction the switch becomes deactuated, and in fact tends to overshoot the neutral point and advance to the opposite contact position, which upon attainment in an undamped system would initiate full-swing oscillation or hunting. However, with this invention the problem is overcome by connecting a damping or retarding device to the spring centered switch unit which causes it to undergo return movement from contact-engaged condition more slowly than the cooperating contact means. As a result, the alternatively engageable switch contact is overtaken and anticipatorily engaged before overshoot can occur during initial follow-up movement. An overshoot-opposing follow-up action ensues as a result, and each cycle of overshoot is thereby reduced, through proper adjustment of damping factor, control displacement and rate, until oscillation is reduced to an acceptable minimum level. It will be noted that in a fully modulated control system of the electronic type this anticipation function is performed by computation or an electrical resolving operation, whereas here it is performed by direct mechanical means with the vehicle or other base as the only feedback element.

These and other features, objects and advantages of the invention will become more fully evident from the following description by reference to the accompanying drawings.

FIGURE 1 is a simplified schematic diagram of a system broadly illustrating the invention in one form.

FIGURE 2 is a schematic diagram of a specific illustrative application of the invention.

Referring to FIGURE 1, the reference device 10 may be of any suitable type, such as a gyro, an accelerometer, a compass element, or other device in relation to which displacement of a base 12 may occur as a result of base motion or otherwise. Switch contacts 14 and 16 are mounted physically in predetermined relationship, as on a support 18, so as to move conjointly. These floating contacts are electrically separate, and when individually engaged by a cooperating separate contact 20 control the base follow-up motion produced by a servomotor 22. The dotted line connecting servomotor 22 and base 12 represents the control system output which may comprise any suitable means to move or reposition the base 12 in response to error of motion or position thereof detected through the medium of reference device 10 and contacts 14, 16 and 20. Such a control system includes the response system 23. Contact 20 is positioned by the reference device 10. Centering and restraining springs 24 connect the support 20 to the base 12. Centering and restraining springs 26 connect the reference device to the base. A viscous fluid damper 28 or equivalent retarding device connects the support 18 to the base 12 as a means to retard return motion of the support caused by restorative recoil force of springs 24 following removal of spring deflection force applied to the support during existence of a displacement of contact 20 from its neutral position relative to contacts 14 and 16. A damper adjustment device 28a is preferably provided to permit varying the damping factor. A neutral point or center trim adjusting device 30 in the spring connections between the support 18 and base 12 is also preferably provided in order to control or set the operating point about which the system functions. This adjustment may be manual, program controlled, or variably controlled in response to any desired condition or function.

In operation, whenever relative displacement occurs causing contact 20 to engage either contact 14 or 16, a follow-up control signal applied to servomotor 22 initiates restorative movement in the system. Any deflection of springs 24 accompanying such engagement tends to restrain and restrict the deflection, adding its effect to that of springs 26. Moreover, the recoil force developed by such deflection drives the support 18 back toward neutral position once the contact 20 leaves the engaged contact 14 or 16 as a result of servomotor drive. Damper 28 retards the spring recoil motion, however, sufficiently that contact 20 overtakes the opposing contact, 14 or 16, in anticipation of arrival of contact 20 in its system centered position. The resultant interengagement of contacts produces an anticipation signal which reverses servomotor drive in order to minimize overshoot of the neutral position. On each succeeding approach to the neutral position of contact 20 an anticipation signal is produced. This thereby damps and minimizes the hunting of the system for the neutral condition following each disturbance or displacement as a result of a change of the motion-involved condition of the base (e.g. rate of turn, pitch angle, direction of heading, roll, acceleration in any axis, etc.).

In FIGURE 2, certain parts which correspond to those in FIGURE 1 are similarly numbered for reference. In this case the system is part of a vehicle steering system and the reference device comprises a turn rate gyro 10' mounted so that its axis of freedom (precession axis) permits contact 20 to be displaced by the gyro in response to a precession (rate of turn) force of selected directionality. In the example, the vehicle comprises an aircraft whose structure is represented by base 12 and whose response system 23' represents the related control surfaces and actuators by which to restore the aircraft structure to a given positional relationship to reference device 10'.

In this specific embodiment the armatures of two solenoids 36 are serially connected with and between the spring sections 24a and 24b of two sets which connect the support 18 with the base 12 and which respectively oppose support displacement in one direction or the other. Energization of one solenoid winding shifts the support one way while energization of the other solenoid shifts it oppositely. These solenoids are shown connected in a separate external control loop including the opposing, alternatively engageable contacts 38 and 40 of a switch actuated by a heading error compass 42. Contacts 38 and 40 are carried by an adjustable support 44 which may be rotated to establish a desired compass heading, while cooperating contact 46 is mounted to move with the compass element.

By opening of switch 50 in the outer control loop, the loop is disconnected from the stabilizer system which then may be utilized as a roll and heading stability augmenter. Under these conditions the system actively opposes spiral neutral stability or instability of the aircraft, as well as artifically augmenting any spiral stability otherwise present in the total control system of the aircraft. Under these conditions automatic roll trimming occurs and it will be necessary to "hold" the aircraft in any turn. This in turn produces a "feel" effect, when the aircraft is manually piloted, which reduces the pilot's need for reliance on visual interpretation of the wings-level artificial horizon presentation, the turn rate gyro and the azimuth gyro of conventional systems.

Thus the external control loop furnishes direction commands which, in the form of solenoid-driven displacement of support 18, are superimposed on the stabilization signals of the inner loop featuring the mechanically damped, spring-restrained switch device which cooperates with the reference device 10'. This technique may be applied similarly in the control and stabilization of climb, turn, yaw, roll or other vehicle movements, conditions of motion, or attitudes, as desired.

In accordance with the broad concept of this invention "lead" or "anticipation" effect is obtained by use of an adjustable viscous damper or equivalent retarding device connected to the floating contacts of the control switch, which contacts are spring centered and restrained, supplemental to the spring centering and restraining effect already provided in the reference device such as a yaw rate gyro, lateral accelerometer, angle-of-attack vane, etc. Without this mechanism, or a fully-modulated computer type control system using amplifiers, relays or other relatively complex circuitry, an error or deviation from the established setting, rate or attitude, or condition of motion, calls for a commanded correction in the opposite direction until the error disappears. This then obviously allows an oscillation of fairly large magnitude to continue undamped. However, with the present anticipation device, each cycle of overshoot is reduced, through proper adjustment of damping, control displacement, and rate, until an acceptable minimum value of residual oscillation exists. A further concept of the invention is that of providing such a stabilization device lending itself to the superpositioning thereon of an outer control loop command signal. This signal, for example, may establish a desired heading, altitude, or angle of attack. Such an outer loop command signal is inserted or superimposed by mechanically displacing the center-point of the floating contacts of the switch device with respect to the center point for the zero error signal position of the turn rate gyro or angle-of-attack vane, for example. The novel system thus may be implemented in simple and straightforward manner by electromechanical means. It requires no computing functions as such and the base (e.g. the vehicle) represents the feedback element.

These and other aspects of the invention will be recognized by those skilled in the art on the basis of the foregoing disclosure of the presently preferred aspects thereof.

I claim as my invention:

1. In a control and follow-up system including a system base element and an associated positional reference element, the two elements being subject to relative displacement in either of opposite senses from a predetermined neutral positional relationship, reversible drive means operable to effect relative movement between said elements from opposite relatively displaced positions in a sense to restore said neutral relationship, cooperable control means, including a first such control means mounted movably in relation to one such element, resilient centering and restraining means connecting said first control means to said one element and constraining it normally to move conjointly therewith while being yieldable to permit relative displacement therebetween, a second such control means being positionally associated with the other such element, one of said first and second control means including positionally spaced control members alternatively engageable by the other of said first and second control means upon predetermined relative displacement occurring between said elements in either sense and thereupon, with continuation of such relative displacement, to effect movement of said first control means relative to said one element against the restorative recoil force of the yieldable resilient means, means controllingly connecting the control members to the drive means to effect relative restorative movement between the elements back toward neutral relationship in response to such engagement of either of said control members, and a retarding device connected between said one element and said one control means to retard the restorative movement of said one control means effected by recoil of the resilient means whereby the other control means overtakes the said one control means to engage the other of said control members to reverse the drive means in anticipation of completion of the restorative movement.

2. The system defined in claim 1, wherein the resilient means comprise return springs and the retarding device comprises a damper having means to vary the damping factor thereof.

3. The system defined in claim 2, and biasing means operable to apply variable preloading to the springs.

4. The system defined in claim 3, and adjustively movable supports connecting the springs to said one element to permit variably preloading said springs.

5. The system defined in claim 1, and means to preload the resilient means including an outer control loop including a command signal generator, and means controlled by said generator connected physically to the resilient means to effect such preloading.

6. In a control and follow-up system including a system base element and an associated positional reference element having resilient centering and restraining means yieldably maintaining such reference element normally in predetermined neutral positional relationship with said base element, the two elements being subject to relative displacement in either of opposite senses from a predetermined neutral positional relationship, reversible drive means operable to effect relative movement between said elements from opposite relatively displaced positions in a sense to restore said neutral relationship, cooperable control means, including a first such control means mounted movably in relation to one such element, second resilient centering and restraining means connecting said first control means to said one element and constraining it normally to move conjointly therewith while being yieldable to permit relative displacement therebetween, a second such control means being positionally associated with the other such element, one of said first and second control means including positionally spaced control members alternatively engageable by the other of said first and second control means upon predetermined relative displacement occurring between said elements in either sense and thereupon, with continuation of such relative displacement, to effect movement of said first control means relative to said one element against the restorative recoil force of the second yieldable resilient means, means controllingly connecting the control members to the drive means to effect relative restorative movement between the elements back toward neutral relationship in response to such engagement of either of said control members, and a retarding device connected between said one element and said one control means to retard the restorative movement of said one control means effected by recoil of the second resilient means whereby the other control means overtakes the said one control means to engage the other of said control members to reverse the drive means in anticipation of completion of the restorative movement.

7. The system defined in claim 6, wherein the base comprises a vehicle, the drive means comprises a vehicle control means, and the reference element comprises a vehicle error responsive device.

8. The system defined in claim 7, and means to preload the resilient means including an outer control loop including a command signal generator, and means controlled by said generator connected physically to the resilient means to effect such preloading.

9. The system defined in claim 8, wherein the reference element comprises a turn gate gyro and the command signal generator comprises a heading reference device.

10. In a control and follow-up system, a movable base, reversible drive means operatively connected to the base to effect repositioning movement thereof in either of opposite senses, a positional reference device operable to move in relation to said base responsively to a change of a motion-involved condition of the base from a predetermined reference condition, a switch means connected to the reference device to be moved thereby, a pair of switch contacts alternatively engageable by said switch means and operatively connected to the drive means for moving the base in one sense or the other by engagement of either of the respective contacts, a common support for said contacts, separate centering springs connected from the base respectively to the common support and to the switch means, and damper means connected to the common support to delay spring-returned motion thereof following contact disengagement after displacement of said support against the force of its spring.

11. In a control and follow-up system, a movable base, reversible drive means operatively connected to the base to effect repositioning movement thereof in either of opposite senses, a positional reference device operable to move in relation to said base responsively to a change of a motion-involved condition of the base from a predetermined reference condition, a switch means connected to the reference device to be moved thereby, a pair of switch contacts alternatively engageable by said switch means and operatively connected to the drive means for moving the base in one sense or the other by engagement of either of the respective contacts, a common support for said contacts, centering spring means connected from the base to the common support, and damper means connected to the common support to delay spring-returned motion thereof following contact disengagement after displacement of said support against the force of its spring means.

References Cited in the file of this patent
UNITED STATES PATENTS

| | | |
|---|---|---|
| 2,819,030 | Christensen | Jan. 7, 1958 |
| 2,987,273 | Wanamaker et al. | June 6, 1961 |
| 2,992,796 | Wheldon | July 18, 1961 |